(12) United States Patent
Muthiah

(10) Patent No.: US 11,074,011 B2
(45) Date of Patent: Jul. 27, 2021

(54) SOLID STATE DRIVE LATENCY ESTIMATION INTERFACE FOR HOST PERFORMANCE TUNING

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/359,662

(22) Filed: Mar. 20, 2019

(65) Prior Publication Data

US 2020/0301606 A1 Sep. 24, 2020

(51) Int. Cl.
*G06F 3/06* (2006.01)

(52) U.S. Cl.
CPC .......... *G06F 3/0659* (2013.01); *G06F 3/0607* (2013.01); *G06F 3/0611* (2013.01); *G06F 3/0679* (2013.01); *G06F 3/0688* (2013.01); *G06F 2212/7207* (2013.01)

(58) Field of Classification Search
CPC .... G06F 3/0659; G06F 3/0607; G06F 3/0679; G06F 3/0611; G06F 3/0688; G06F 2212/7207
See application file for complete search history.

(56) References Cited

U.S. PATENT DOCUMENTS

| 7,930,507 | B2 | 4/2011 | Perry |
| 8,117,415 | B2 | 2/2012 | Perry |
| 8,255,618 | B1 | 8/2012 | Borchers et al. |
| 8,341,311 | B1 | 12/2012 | Szewerenko et al. |
| 9,354,814 | B2 | 5/2016 | Alcantara et al. |
| 9,477,408 | B1 | 10/2016 | Perlstein et al. |
| 9,569,390 | B2 | 2/2017 | Rudy et al. |
| 9,665,479 | B2 | 5/2017 | Gao |
| 9,829,957 | B2 | 11/2017 | Yasin et al. |
| 10,254,970 | B1 | 4/2019 | Martin et al. |
| 2009/0259749 | A1 | 10/2009 | Barrett et al. |
| 2012/0054329 | A1 | 3/2012 | Gulati et al. |
| 2013/0124267 | A1 | 5/2013 | O'Sullivan et al. |
| 2013/0312005 | A1 | 11/2013 | Chiu et al. |
| 2015/0020078 | A1 | 1/2015 | Kuesel et al. |
| 2015/0135194 | A1 | 5/2015 | Cavazos et al. |
| 2015/0149462 | A1 | 5/2015 | Biyani et al. |

(Continued)

OTHER PUBLICATIONS

Allain, Rhett, Can Apple Predict How Long a Transfer Takes?, Wired.com, Oct. 9, 2014.

(Continued)

*Primary Examiner* — Kalpit Parikh
(74) *Attorney, Agent, or Firm* — Patent Law Works LLP

(57) ABSTRACT

A solid state drive system and method receives read commands, write commands, and/or file system updates. The solid state drive system then determines the latency estimate for performing each of those commands asynchronously. The solid state drive system may utilize internal processes to determine the latency estimate. The latency estimate may include random access latency, block erase time, outstanding workload latency, garbage collection time, metadata write time, etc. The latency estimate is then returned to the host device. The host device may utilize the latency estimate to workload balance solid state drive systems.

20 Claims, 8 Drawing Sheets

(56) References Cited

U.S. PATENT DOCUMENTS

| | | |
|---|---|---|
| 2015/0293997 A1 | 10/2015 | Smith et al. |
| 2015/0301754 A1* | 10/2015 | Kochar ................ G06F 3/0616 |
| | | 711/103 |
| 2016/0283119 A1 | 9/2016 | Frickey, III et al. |
| 2016/0299697 A1 | 10/2016 | Chen et al. |
| 2016/0300252 A1 | 10/2016 | Frank et al. |
| 2017/0177222 A1 | 6/2017 | Singh et al. |
| 2018/0046395 A1* | 2/2018 | Sekimoto .............. G06F 3/0604 |
| 2018/0067844 A1 | 3/2018 | Conti et al. |
| 2018/0273064 A1 | 9/2018 | Brooks et al. |
| 2019/0079676 A1* | 3/2019 | Seo ..................... G06F 13/1626 |
| 2019/0312772 A1 | 10/2019 | Zhao et al. |

OTHER PUBLICATIONS

How to move your content to a new Mac, Apple Support, Oct. 25, 2019.

USPTO Final Office Action for U.S. Appl. No. 16/290,705, dated Jan. 7, 2020.

USPTO Non-Final Office Action for U.S. Appl. No. 16/290,705, dated Jul. 10, 2020.

\* cited by examiner

SOLID STATE DRIVE LATENCY ESTIMATION INTERFACE FOR HOST PERFORMANCE TUNING

BACKGROUND

Host devices utilize solid state drives to store and retrieve data. Write commands and read commands are utilized, respectively, to perform these functions. Each command may take a particular amount of time to execute, i.e., the latency, from the time of command acknowledgment. A latency estimate may enable the host device to display an estimated completion time for a command to a user via a graphical user interface, select amongst one or more solid state drives to perform the command, etc.

Conventional latency estimate techniques may determine an average latency of a solid state drive over a number of commands to determine a current latency estimate. Such a conventional technique utilizes neither information regarding the specific operation for the current command nor a current operational state of the solid state drive to determine the latency estimate. Using the information regarding the specific operation for the current command and the current operational state of the solid state drive to determine the latency estimate results in more accurate predictions that may be displayed to a user, as well as, more efficient utilization of multi-solid state drive systems. Furthermore, the host device may have latency threshold requirements for some commands. A latency estimate that utilizes the current operational state may enable the host device to meet such thresholds.

BRIEF SUMMARY

A latency estimate is generated by a solid state drive in response to receiving a command from a host device at the time of command acknowledgment. The latency estimate may be sent to the host device before or during the actual processing of the command itself. The host device may then utilize the latency estimate for further operations, including generating graphical user interface displays estimating the time to complete a data transfer for a file group, selecting a solid state drive for command completion, etc. The host device may send a further command to abort the completion of a previously sent command. Such a command may be removed from a command queue. As this process may be asynchronous, the command may be in various states of completion.

The latency estimate may be performed for a file or file group. The solid state drive may pass to the host device a latency estimate for the command completion, utilizing information such as the free memory blocks/used blocks, single level cell memory blocks/multi-level cell memory blocks, overall static and dynamic garbage collection workload, and the state of garbage collection, such as "balanced" or "urgent". The latency estimate for the command completion may explicitly recognize the amount of future work for that command in terms of a total command execution latency based on the ability of the solid state drive to perform those tasks. The host device may pass the total command size (e.g., based on a file group to read or write) to the solid state drive as a "hint" that the command is the first of multiple commands of a larger workload request for a file group. The solid state drive may utilize the hint from the host to determine the intrinsic resource utilization required to carry out the command. For example, if the transfer is going to happen to a multi-level cell such that the transfer may fill the whole block followed by filling to a next memory block, then block erase time is also included in the latency estimate. Similarly, multiple such latencies are budgeted based on the controller state machine. The solid state drive may further evaluate the open block type, flash translation layer state (cache flush operation required or not), garbage collection requirement, etc., to determine the latency estimate for processing the command. The firmware may also determine its current operational state, and expected state transitions for the current command data length. This determination along with hardware resources and other factors such as memory quality, memory age, and peak power requirements are used to periodically match estimates on the workload to the total command execution latency.

The solid state drive may return to the host device a latency estimate for a total command execution latency for a file system update for a file group. The solid state drive may pass this information based at least in part on the latency of random data accesses involved in performing the file system update as indicated by the hint provided by the host device via the host device interface. The solid state drive returns to the host device information related to a file system update latency, which the host device operation system may utilize as a latency estimate for the whole set of files. Each time a file of the file group is written, deleted, or otherwise updated, the solid state drive may write (e.g., update or erase) metadata about the file. Depending on the particular file system, this information may be directed to a part of the solid state drive different than the location where the file itself is being written.

During arbitration and prioritization of multiple submitted commands, the solid state drive may send a latency estimate to the host device of each command in an order it plans to process. The determination of the latency estimate for the first command of a group of commands may be the least complex, as no other command is utilizing the solid state drive resources when the first command is received. For subsequent commands, the latency estimate determination may depend on the host interface protocols. Some host interface protocols are blocking host interface protocols (e.g., Universal Serial Bus (USB) 3.0 and Secure Digital), while others are non-blocking host interface protocols (e.g., Peripheral Component Interconnect Express (PCIe)-to-solid state drive). For blocking host interface protocols, the commands are processed in sequence, enabling the resources only for the command currently under execution. For non-blocking host interface protocols, the host device submits multiple commands with different priority queues and expects data and the command, both, out of order, the solid state drive determines the latency estimate for the second command assuming the initial state as well as assuming that the first command keeps some of the resources busy for a determined command execution latency based on the length, sequential-ness, and logical range of that command. This logic is extended for subsequent commands. The solid state drive executes commands based on the priority of the command/queue and the number of commands currently executing in device which determine the total command execution latency involved in executing a new command.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

This disclosure relates to a method by which a solid state drive may estimate latency for executing a command sent from a host device. Such a latency estimate may include an estimated time to complete the command itself, as well as additional latency incurred (e.g., accumulated) through tasks not explicitly commanded, but performed during command execution. Such tasks may include erasing memory blocks before a write command is performed, garbage collection tasks, writing file metadata in addition to writing a file, accessing a lookup table, etc. Latency estimates may be returned to the host device at the time of command acknowledgment, before the command is processed. In this manner, the host device may be informed of the expected latency from each of a set of solid state drives, and may route more tasks to devices reporting lower latency.

Write commands and file system update commands for file groups may be particularly complex, compared to read commands, and may therefore incur greater latency. In some embodiments, read commands may only require accessing a lookup table to locate the desired data, then sending the data back. Write commands, in some embodiments, may require, a certain number of memory blocks to be completely or partially erased. Garbage collection tasks may also be performed. If enough consecutive blocks are not available for the data to be contiguous, multiple address ranges may need to be cleaned up to receive data, and these ranges may need to be recorded in a lookup table. The action of writing a value to a memory cell may also take longer than the action of reading a value recorded.

The solid state drive may also estimate a total command execution latency for a file system update based on expected latency for random data access, based on a hint about the file group passed to the solid state drive over the host device interface. The hint may comprise information about a number of files in the file group, a size of each file, a number of commands for processing the file group, a size of each command to process the file group, and combinations of these. The host device may utilize the expected total command execution latency to form a precise estimate of how long the transfer or other update of a file group may take.

Firmware on the solid state drive may be capable of realizing its current operational state and anticipating expected state transitions for a file system update associated with a file group. This ability, along with hardware resources and factors such as memory quality, memory age, and peak power requirements, may be used to periodically evaluate workload estimates against total command execution latency. In this manner, the latency expected for a random memory access, which may be used in calculating command execution latency, may be modified over time by incorporating a latency learning module in some embodiments of this disclosure.

Figure 1:
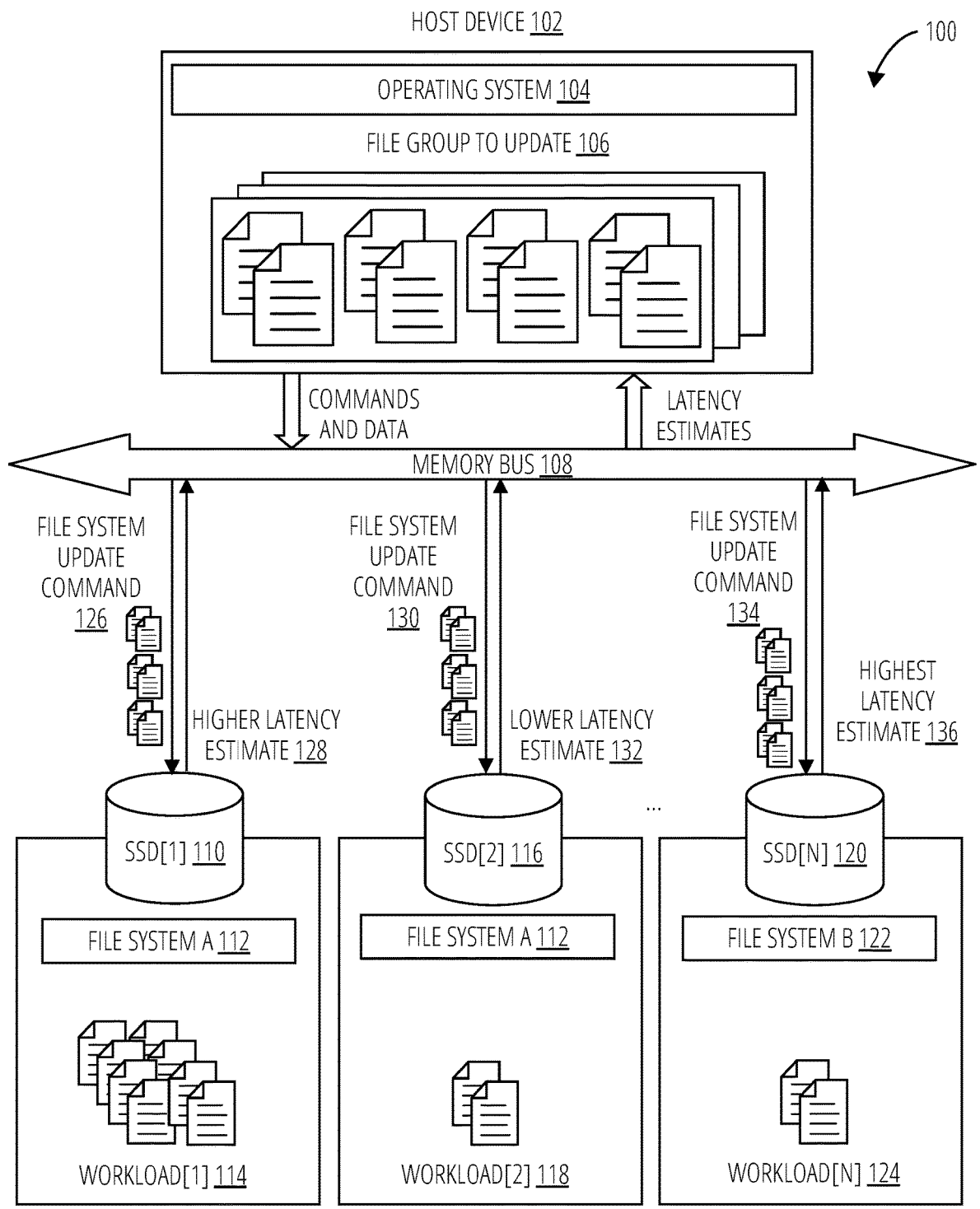
FIG. 1 illustrates a system 100 in accordance with one embodiment.

Referring to FIG. 1, a system 100 comprises a host device 102, a memory bus 108, and various solid state drives (first solid state drive 110, a second solid state drive 116, . . . nth solid state drive 120. The host device 102 includes an operating system 104 and a file group to update 106. The first solid state drive 110, the second solid state drive 116, and the nth solid state drive 120 further comprise a file system A 112 and a first workload 114, the file system A 112 and a second workload 118, and a file system B 122 and an nth workload 124, respectively.

The host device 102 may be a computer or other device connected to a computer network. Devices may include smartphones, microcomputers, workstations, personal computers, laptops, minicomputers, mainframe computers, supercomputers, tablet computers, cloud computers, etc. The host device 102 includes the operating system 104, which is system software that manages computer hardware and software resources and provides common services for computer programs. Each operating system 104 may have a specific file system to be utilized, such as the file system A 112 or the file system B 122. The file system format of the host device 102 may be utilized on one or more of the solid state drives.

The host device 102 may include (e.g., store) the file group to update 106. The file group to update 106 may include data and metadata regarding the file group, e.g., overhead of the file system. The host device 102 may issue commands to write or otherwise update the file group to update 106 to one of the solid state drives.

The host device 102 utilizes the memory bus 108 to send commands and data to the first solid state drive 110, the second solid state drive 116, and/or the nth solid state drive 120. The memory bus 108 may be a computer bus that connects the main memory to the memory controller in computer systems. Commands may include read commands, write commands, erase commands, file system updates, etc. The host device 102 may select the solid state drive to which to send commands based on latency estimates provided by the solid state drives. The host device 102 may send the same commands to multiple solid state drives and choose which solid state drive to utilize with the command based on the latency estimates received for those commands.

The host device 102 receives latency estimates from the first solid state drive 110, the second solid state drive 116, and/or the nth solid state drive 120 via the memory bus 108. As depicted, the host device 102 sends (via the memory bus 108) file system update command 126 to the first solid state drive 110, file system update command 130 to the second solid state drive 116, and file system update command 134 to the nth solid state drive 120. The host device 102 receives (via the memory bus 108), the latency estimates including the higher latency estimate 128 from the first solid state drive 110, the lower latency estimate 132 from the second solid state drive 116, and the highest latency estimate 136 from the nth solid state drive 120.

The first solid state drive 110 comprises the file system A 112 and the first workload 114. The first workload 114 may include previously received commands from the host device 102 or another device. The first workload 114 may be based on a command queue of the first solid state drive 110. The first workload 114 may also be based on internal processes underway within the first solid state drive 110. The first solid state drive 110 receives the file system update command 126 from the host device 102 via the memory bus 108. The file system update command 126 may be received via a control channel and/or a data channel. For example, the file system update command 126 may be a command and data to the first solid state drive 110 to write a portion of the file group to update 106. The portion of the file group to update 106 to write to the first solid state drive 110 may be determined based on a latency estimate for previous commands received by the host device 102 from the first solid state drive 110.

Once the file system update command 126 is received by the first solid state drive 110, the first solid state drive 110 generates a latency estimate, here, the higher latency estimate 128. The first solid state drive 110 may utilize the command latency estimation system 200 depicted in FIG. 2 to generate the latency estimate. The higher latency estimate 128 may be higher than the latency estimate generated by the second solid state drive 116, i.e., the lower latency estimate 132, due to the first workload 114 being greater than the second workload 118. Other factors may also be included as discussed in reference to FIG. 2. The higher latency estimate 128 is provided to the host device 102 via the memory bus 108. The higher latency estimate 128 may be sent via the control channel and/or a data channel.

The second solid state drive 116 comprises the file system A 112 and the second workload 118. The second workload 118 may include previously received commands from the host device 102 or another device. The second workload 118 may be based on a command queue and internal processes of the second solid state drive 116. The second solid state drive 116 receives the file system update command 130 from the host device 102 via the memory bus 108. For example, the file system update command 130 may be a command to the second solid state drive 116 to write a portion of the file group to update 106. The portion of the file group to update 106 to write to the second solid state drive 116 may be based on a latency estimate received from the second solid state drive 116 for previous commands from the host device 102.

Once the file system update command 130 is received by the second solid state drive 116, the second solid state drive 116 generates a latency estimate, here, the lower latency estimate 132. The second solid state drive 116 may utilize the command latency estimation system 200 depicted in FIG. 2 to generate the latency estimate. The lower latency estimate 132 may be lower than the latency estimate generated by the first solid state drive 110, i.e., the higher latency estimate 128, due to the second workload 118 being less than the first workload 114. Other factors may also be included as discussed in reference to FIG. 2. The lower latency estimate 132 is provided to the host device 102 via the memory bus 108. The lower latency estimate 132 may be provided via a control channel and/or data channel.

The nth solid state drive 120 (where n is any integer >2 in this example, indicating n total solid state drives in the example system 100) comprises the file system B 122 and the nth workload 124. The file system B 122 may have been received from a host device other than the host device 102, or for example the host device 102 may have also previously operated utilizing the file system B 122. The nth workload 124 may be based on previously received commands from the host device 102 or another device, such prior commands either in-process or queued for processing in a command queue (as with first solid state drive 110 and second solid state drive 116).

The nth solid state drive 120 receives the file system update command 134 from the host device 102 via the memory bus 108. For example, during an initial handshake performed when the nth solid state drive 120 is connected to the host device 102 via the memory bus 108, the host device 102 may determine that the file system utilized by the nth solid state drive 120, the file system B 122, is not the file system utilized by the host device 102, the file system A 112. The host device 102 then sends the file system update command 134 to the nth solid state drive 120 to update the file system B 122 to the file system A 112 (this is commonly referred to as a "re-format" of the solid state drive). Typically, file system update command 134 is utilized along with write commands or erase commands. Thus any one of the solid state drives may include a file system update latency as part of a latency estimate when a write command or erase command is received that requires a file system update, e.g., to write or otherwise modify a file group.

Once the file system update command 134 is received by the nth solid state drive 120, the nth solid state drive 120 generates a latency estimate, here, the highest latency estimate 136 (due to the reformatting required for nth solid state drive 120). The nth solid state drive 120 may utilize the latency estimation system 300 depicted in FIG. 3 to generate the latency estimate. The highest latency estimate 136 is provided to the host device 102 via the memory bus 108, in the manners described previously.

Figure 2:
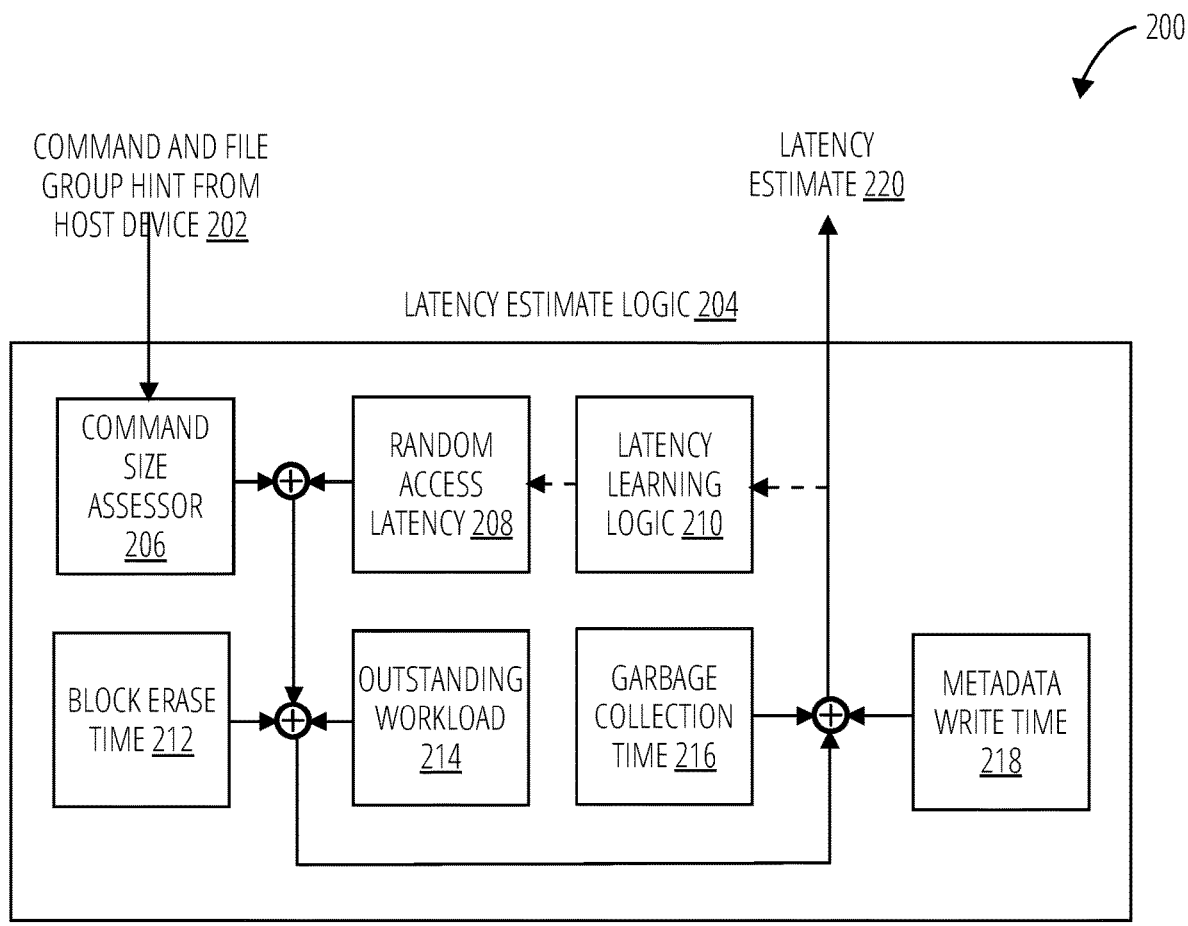
FIG. 2 illustrates a command latency estimation system 200 in accordance with one embodiment.

Referring to FIG. 2, a command latency estimation system 200 is shown in one embodiment. The command latency estimation system 200 comprises latency estimate logic 204 that applies a command and file group hint from host device 202 to produce a latency estimate 220. The latency estimate logic 204 includes a command size assessor 206, a random access latency assessor 208, latency learning logic 210, a block erase time estimator 212, an outstanding workload estimator 214, a garbage collection time estimator 216, and a metadata write time estimator 218.

The latency estimate logic 204 receives the command and file group hint from host device 202. The command size assessor 206 then determines the size of the command, which may include a number of random memory accesses to perform a file system update. The command and file group hint from host device 202 may include a size of the command. For example, a file system update may comprise the data to be written for multiple files of a file group, leading to a larger total command size. A write command of about 20 blocks may have lower estimated latency than a write command of about 100 blocks. A read command may comprise either (a) a start address and a size of memory to be read, or (b) an address range, which may indicate how much data the solid state drive may send to the host device, or a number of bytes. Thus, the latency estimate logic may explicitly recognize the amount of work the solid state drive needs to perform to execute a given file group command.

The command and file group hint from host device 202 may take into account multiple commands that together will be needed to perform a file system update for a file group. Thus the command and file group hint from host device 202 may indicate the size of the total set of commands for the entire job. The latency estimate logic 204 may then provide a latency estimate on the total command execution latency as part of the latency estimate 220. Such a latency estimate 220 may enable the host to more efficiently distribute the set of task across multiple solid state drives. The command size assessor 206 then provides an initial latency estimate based on the size of the data to be written or read.

The random access latency assessor 208 (which may be optional) then supplements the initial latency estimate provided by the command size assessor 206. The random access latency assessor 208 provides an estimate of the time (latency) to perform random access operations during command execution. The random access latency assessor 208 may return a time value configured during manufacture of the device. The random access latency assessor 208 output may also be proportional to the size of the command. The random access latency assessor 208 may return a time value stored in a lookup table, for example, or calculated from a value in a lookup table. The random access latency assessor 208 may also alter the returned value for a random access over time. For example, as the device is utilized, the random access latency assessor 208 may increase the estimated time value it returns, due to a higher bit error rate or increased number of unreliable memory blocks of the solid state drive. The random access latency assessor 208 may provide an output that is responsive to the latency learning logic 210. The latency learning logic 210 may receive the latency estimate 220 for each command, compare it to an actual latency incurred to process the command, and utilize learning techniques (e.g., machine learning) known in the art to update the random access latency assessor 208. The latency learning logic 210 may continuously or periodically update the random access latency assessor 208. The latency learning logic 210 may also initiate updating the random access latency assessor 208 after a pre-determined time period or memory cycles for a particular memory technology (e.g., 2-3 years or 10,000 cycles). Furthermore, the latency learning logic 210 may update the random access latency assessor 208 if the actual latencies incurred begin to exceed a threshold value. One such threshold value may be the initial random access latency value(s) configured in the lookup table at manufacturing time.

In addition to the random access latency assessor 208 output value, the block erase time estimator 212 output value may be added to the latency estimate 220. The block erase time estimator 212 may estimate the latency incurred, for example, to process a write command that erases a certain number of memory blocks. Thus, the blocks to be erased are determined and a time to erase such blocks is estimated. The block erase time estimator 212 output value is (optionally) added to the latency estimate 220.

A latency estimate value output from the outstanding workload estimator 214 is (optionally) also added to the latency estimate 220. The outstanding workload estimator 214 may provide a latency estimate based on queued commands with a higher priority than the command and file group hint from host device 202 and possibly other internal processed of the solid state drive. The outstanding workload estimator 214 output may depend on the interface type of the host device to the solid state drive (blocking or non-blocking). With a blocking type interface, a latency estimate is determined for each command received earlier than the command and file group hint from host device 202. These latency estimates may have been previously determined and stored by the latency estimate logic 204. For non-blocking type interfaces, commands may be performed in parallel. Thus in some cases a lower priority command may begin executing prior to a higher priority command being started and/or completed. The latency estimate logic 204 may make a latency estimate assuming an initial state, as well as assuming that certain commands will keep resources of the solid state drive busy for a determined command execution latency based on the length, sequential-ness, and logical range of those commands.

The garbage collection time estimator 216 output value may then (optionally) be added to the latency estimate. Garbage collection tasks may be initiated based on a number of dirty blocks to recycle. The state of garbage collection, such as "balanced" or "urgent", may also affect the output of the garbage collection time estimator 216.

Finally, the metadata write time estimator 218 output value is (optionally) added to the latency estimate. Each time a file is written to a file system, additional metadata about the file may also be written to update the file system. Depending on the specific file system, the metadata may be written to a part of the solid state drive that is different from the location where the file data is written. For file systems in which the metadata is written, the metadata write time estimator 218 output may be added to the latency estimate for write commands. Once the metadata write time estimator 218 value is added (if applicable), the final latency estimate 220 is provided by the latency estimate logic 204 to a host device. The latency estimate logic 204 may further be operated in accordance with the command latency estimation process 400 and the workload estimation process 600 depicted in FIG. 4 and FIG. 6, respectively.

Figure 3:
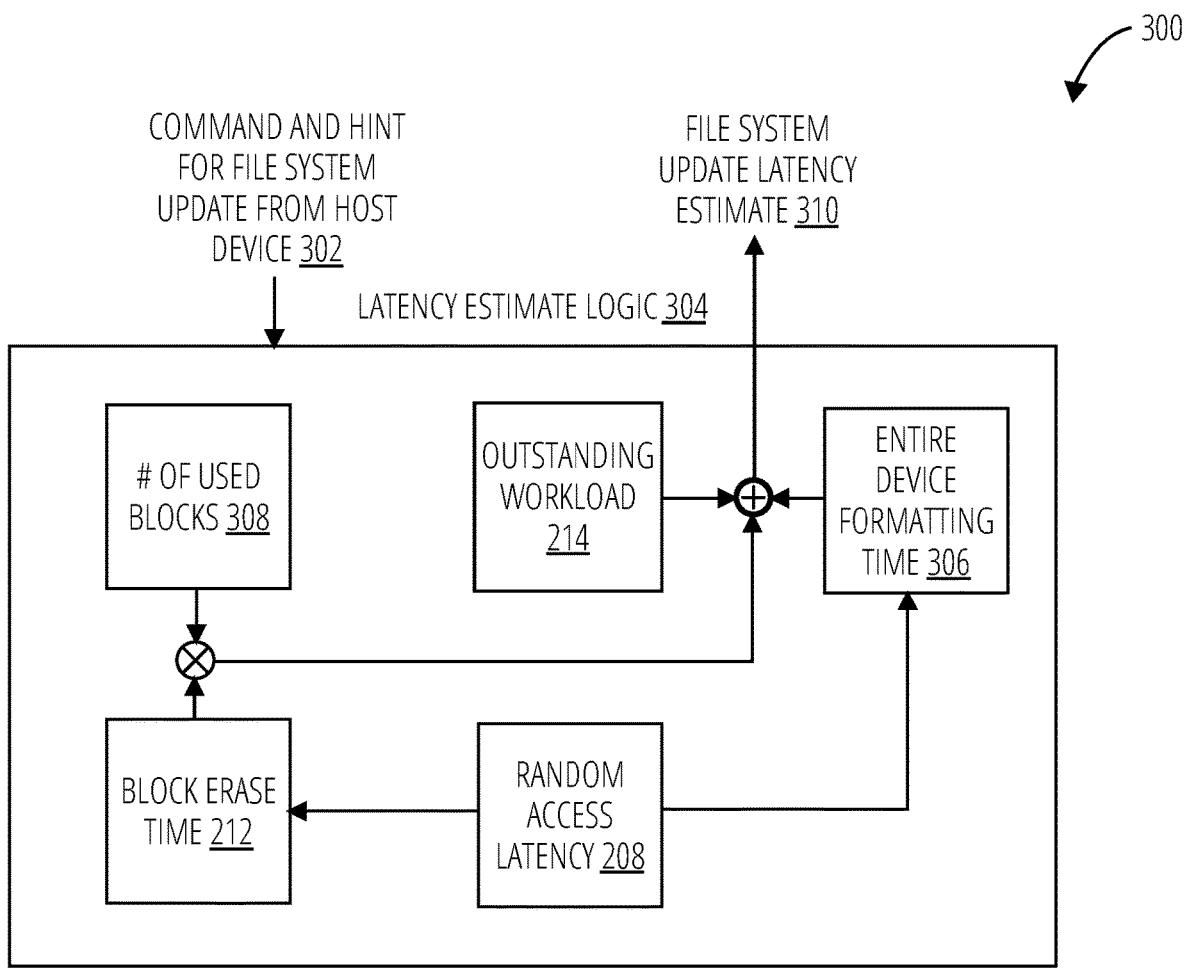
FIG. 3 illustrates a latency estimation system 300 in accordance with one embodiment.

Referring to FIG. 3, a latency estimation system 300 applies a file system update command 302 to latency estimate logic 304 to generate a file system update latency estimate 310. In addition to components introduced earlier, the latency estimate logic 304 further includes a formatting time estimator 306 and a used blocks estimator 308.

The latency estimate logic 304 receives the file system update command 302. The file system update command 302 may include the size of the metadata for the file system update, or this may be inferred from the file system update command 302. Writing the metadata for the file system update may be performed as a number of random accesses. Therefore, the formatting time estimator 306 output may be determined utilizing the size and/or distribution of the metadata for the file system update and the random access latency assessor 208. Thus the random access latency assessor 208 may be utilized to determine the block erase time estimator 212 output.

The used blocks estimator 308 output may be multiplied by the block erase time estimator 212 output to determine a total block erase time, which is added to the formatting time estimator 306 output.

The outstanding workload estimator 214 output may be determined as described above regarding FIG. 2. Furthermore, the workload estimation process 600 depicted in FIG. 6 may be utilized to determine the outstanding workload estimator 214 output. The outstanding workload estimator 214 output is added to the formatting time estimator 306 output and the estimated block erase time from the block erase time estimator 212. The file system update latency estimate 310 is thus formed from the formatting time estimator 306 output, the total block erase time determined from the block erase time estimator 212 and the used blocks estimator 308, and the output of the outstanding workload estimator 214.

The file system update latency estimate 310 may be provided to the host device. The file system update latency estimate 310 may also be included as part of a latency estimate for a read command or a write command in which a file system update is to be performed as well. The latency estimate logic 304 may further be operated in accordance with the file system update latency estimation process 500 and the workload estimation process 600 depicted in FIG. 5 and FIG. 6, respectively.

Figure 4:
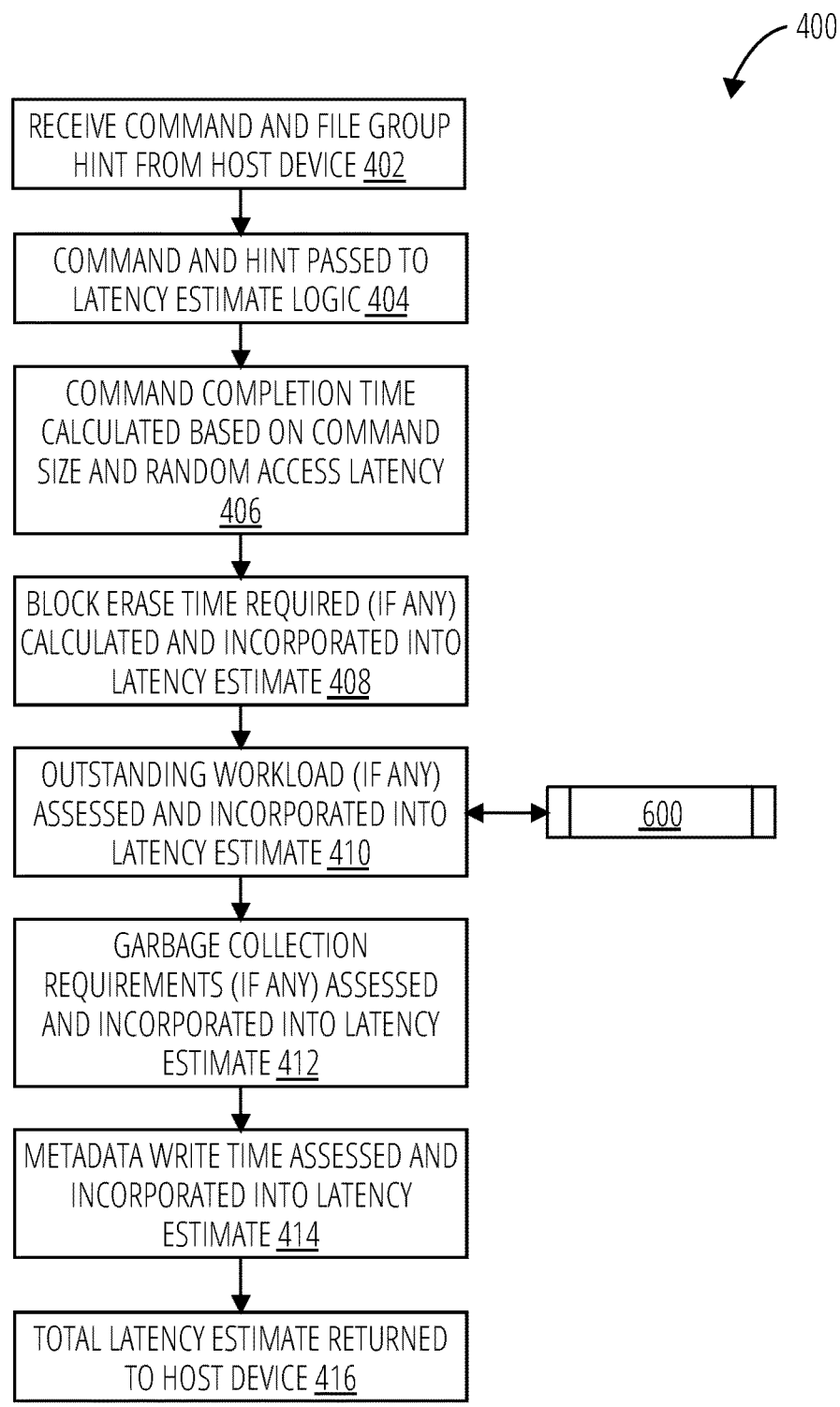
FIG. 4 illustrates a command latency estimation process 400 in accordance with one embodiment.

Referring to FIG. 4, a command latency estimation process 400 receives a command from a host device (block 402). The command is passed to latency estimate logic (block 404). The latency estimate logic may be stored on and executed by a solid state drive. A command completion time is calculated based on command size and random access latency (block 406). The command size may be included with or inferred from the command. Further, the command may be one of multiple commands forming an overall command. The command size, in that embodiment, may be the size of the overall command. Any or all of the information about the overall command size or number or location of files in the file group may be included in a hint provided by the host device.

The random access latency may be a time to perform a random access process. The value for the random access latency may be pre-determined at manufacturing time, or the value may subsequently be updated by, for example, latency learning logic. The size may correlate to a number of random accesses and/or their addresses in memory. Thus, the estimated number of random accesses based on size may be multiplied by the (fixed) random access latency to determine a component of the latency estimate. Block erase time (if any) is calculated or obtained from a fixed value, and incorporated into the latency estimate (block 408). The command latency estimation process 400 may determine the number of blocks to be erased based on a write command. The number of blocks to be erased is then utilized to determine a block erase time. The random access latency may also be utilized for each block to be erased, in some cases.

The outstanding workload (if any) is assessed and incorporated into the latency estimate (block 410). The workload portion affecting the latency estimate may be based on the priority of the command and the type of connection to the host device. The workload may be determined utilizing the workload estimation process 600 depicted in FIG. 6.

Garbage collection requirements (if any) are assessed and incorporated into latency estimate (block 412). If enough consecutive blocks are not available for the data to be contiguous, multiple address ranges may need to be cleaned up to receive data, and these ranges may need to be recorded in a lookup table. The time to clean up and record the ranges may be added to the latency estimate. The state of garbage collection, such as "balanced" or "urgent", may also affect the garbage collection time.

A metadata write time is assessed and incorporated into the latency estimate (block 414). Each time a file is written to a file system or updated, additional metadata about the file may also be written. Depending on the specific file system, the metadata may be written to a part of the solid state drive that is different from the location where the file data is written. For file systems in which the metadata is written, this may also affect the latency estimate generated for file system update commands. The time to write the metadata may then be added to the latency estimate (for example, as one or more random access latencies). A total latency estimate is then returned to the host device (block 416).

Figure 5:
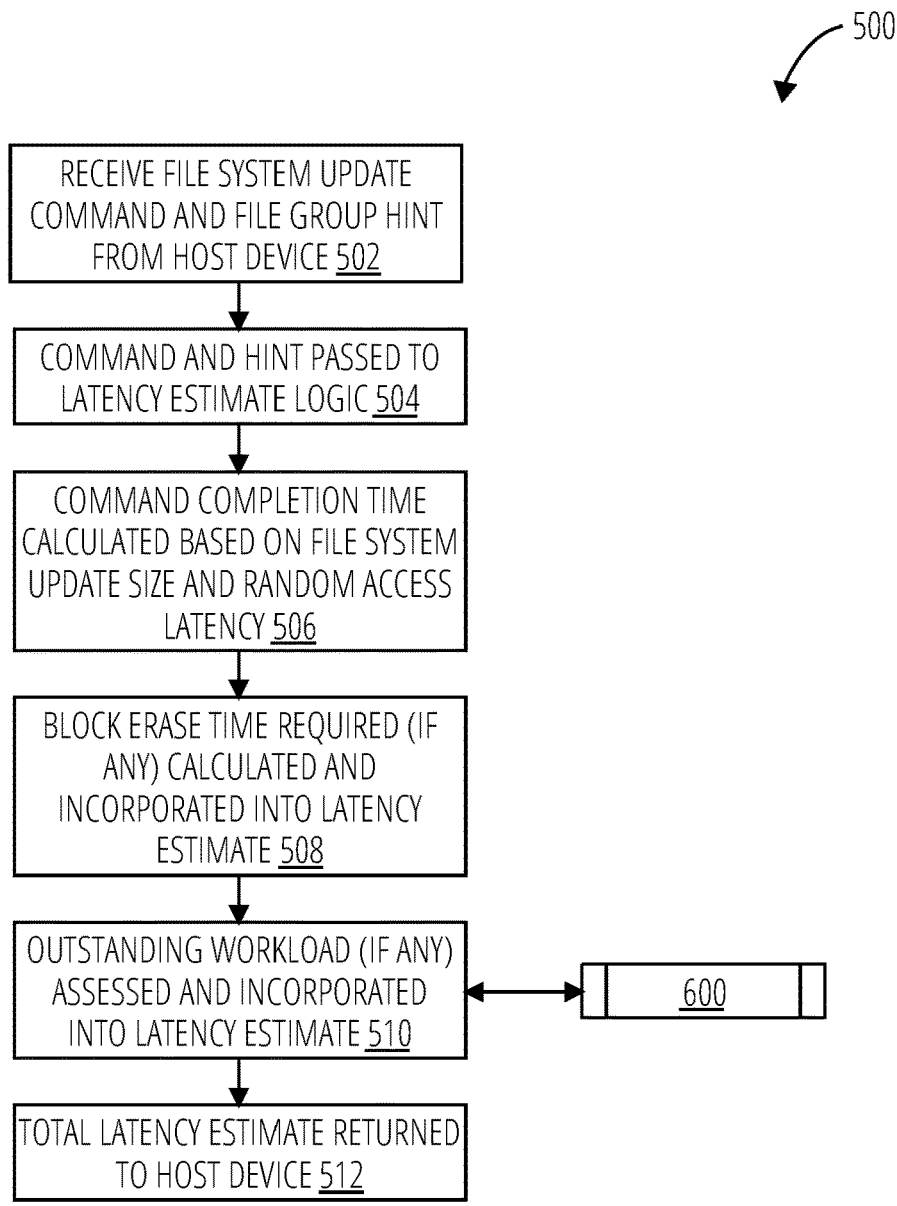
FIG. 5 illustrates a file system update latency estimation process 500 in accordance with one embodiment.

Referring to FIG. 5, a file system update latency estimation process 500 receives a file system update command and hint from a host device (block 502). The file system update command may include the metadata to be written for the file system update. The command and hint are passed to latency estimate logic (block 504). The latency estimate logic may be stored on and executed by a solid state drive.

A command completion time is calculated based on file system update data size and random access latency (block 506). The file system updates latency metadata for the file system update, which may in turn involve the time to perform one or more random access and/or block erase process. The value for the random access latency may be pre-determined for some solid state drives, or in other cases determined dynamically using latency learning logic. The estimated number of random accesses may be multiplied by the random access latency to determine the latency estimate.

Block erase time required (if any) is calculated and incorporated into the latency estimate (block 508). The file system update latency estimation process 500 may determine the number of blocks to be erased based on a write command or erase command, e.g., to add or update or remove a file. The number of blocks to be erased is then utilized to determine a total block erase time.

An outstanding workload (if any) is assessed and incorporated into the latency estimate (block 510). The workload may be based on the priority of the command and the type of connection to the host device. The workload may be determined utilizing the workload estimation process 600 depicted in FIG. 6. A total latency estimate is returned to host device (block 512). The total latency estimate may be a sum of the command completion time, the block erase time, and the workload.

Figure 6:
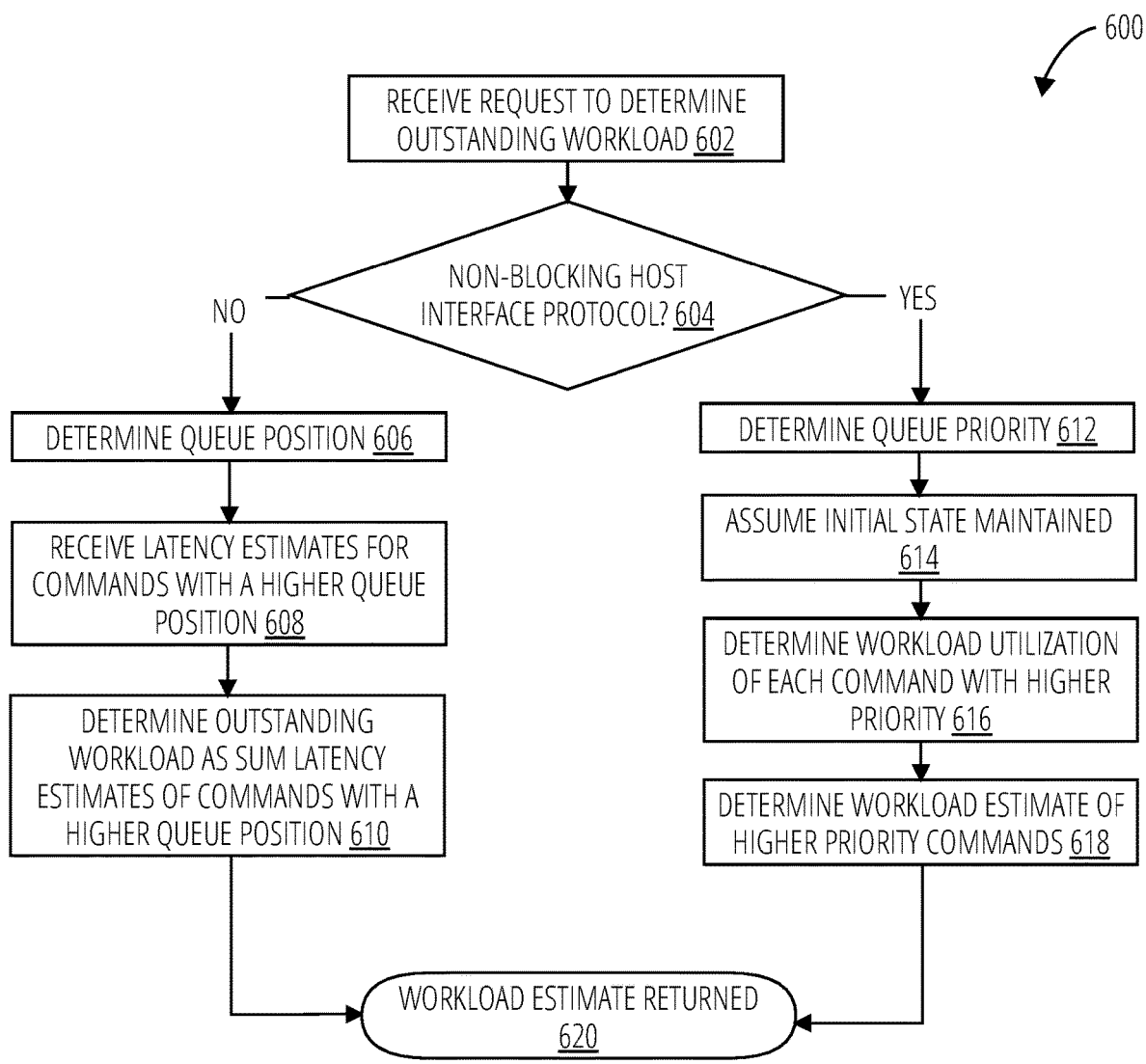
FIG. 6 illustrates a workload estimation process 600 in accordance with one embodiment.

Referring to FIG. 6, a workload estimation process 600 responds to a request, or acts on its own initiative (e.g., as a background management process), to determine outstanding workload (block 602) of a solid state drive. The workload estimation process 600 may operate based upon the type of host interface protocol, either a blocking host interface protocol or a non-blocking host interface protocol (decision block 604). The solid state drive includes a host device interface that communicates with the host device using a particular host interface protocol. In blocking host interface protocols (e.g., USB 3.0 and Secure Digital), commands are processed in the order in which they were received. Resources are allocated only to the command currently under execution. In non-blocking host interface protocols (e.g., PCIe/Non-Volatile Memory Express for solid state drives), the host device may submit multiple commands to different priority queues and may expect both the data and the commands to be processed out of order.

For a blocking host interface protocol, a queue position of the command is determined (block 606). A latency estimate is evaluated for the commands with a higher queue position (block 608). The latency estimates may be stored by the solid state drive. The received latency estimate may have been determined previously by the command latency estimation process 400 or the file system update latency estimation process 500, when such previous commands were received, and stored for later use. The outstanding workload estimate is determined as a sum of the latency estimates of the commands with a higher queue position (block 610), e.g., the commands expected to execute before execution of the command being evaluated for latency.

For a non-blocking host interface protocol, a queue priority is determined for the command (block 612). The workload estimation process 600 may assume the initial state is maintained (block 614). A workload utilization is determined for each command with higher priority (block 616). The workload utilization for the highest priority command is based on length, sequential-ness, and logical range. This basis is extended for subsequent higher priority commands and may hold well as long as the working conditions are "typical", e.g., within a configured utilization and/or environment. The workload estimation process 600 may, for example, re-determine the latency estimate for non-executed commands if the initial state is not maintained.

A workload estimate of higher priority commands is then determined (block 618). The number of resources utilized may be converted into a latency estimate. For example, if the number of resources utilized is eighty (80) percent of the total resources available, then twenty (20) percent of the resources are available for the command being assessed. In one embodiment, the latency estimate may be multiplied by a factor of five (5) or a factor of four (4) times under these circumstances. In another embodiment, a lookup table may be utilized to determine a latency estimate for various levels of resource utilization. Other methods may also be utilized to determine the workload estimate. The workload estimate is then returned to the command latency estimation process 400 or the file system update latency estimation process 500 (done block 620).

Figure 7:
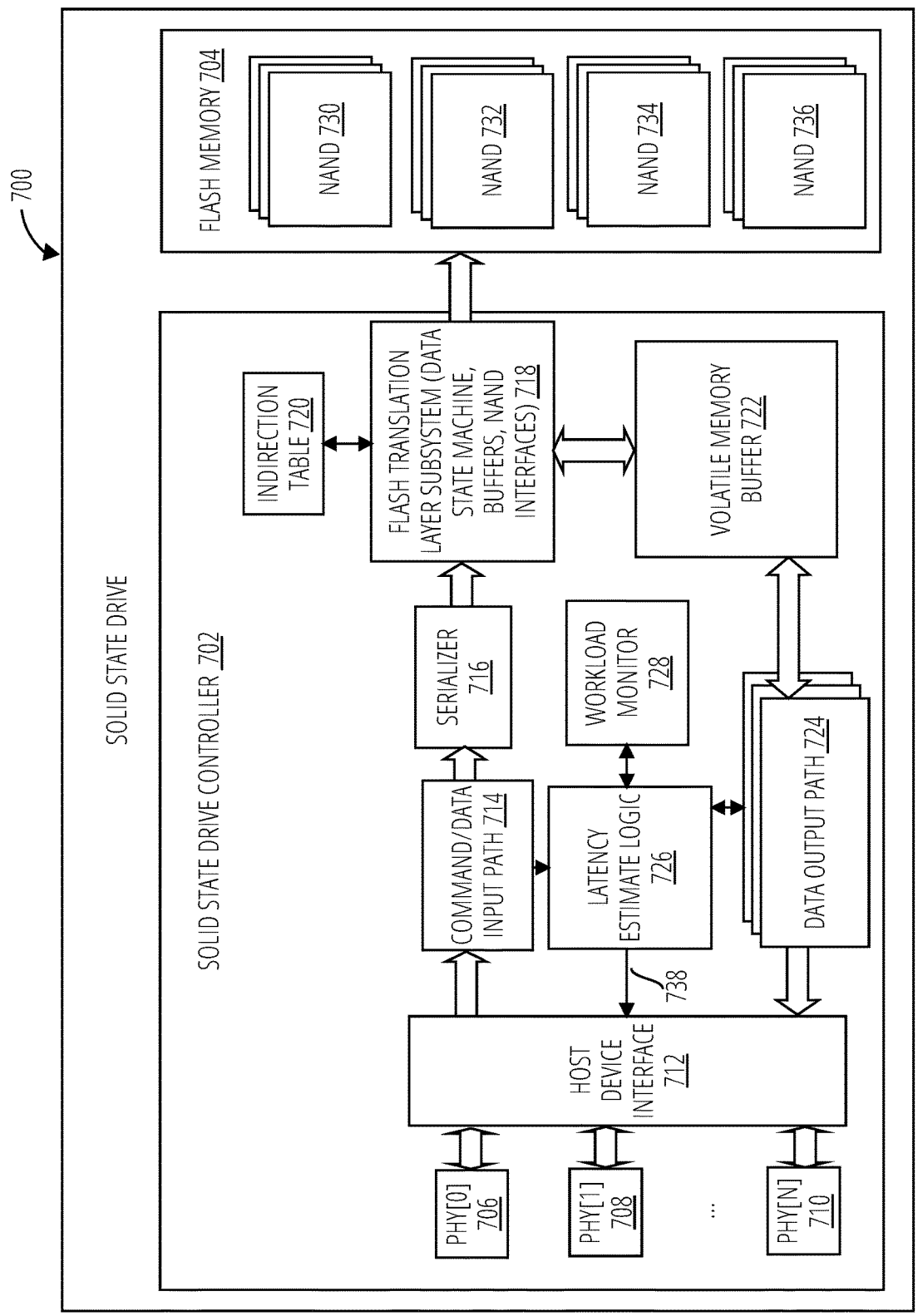
FIG. 7 illustrates a solid state drive 700 in accordance with one embodiment.

Referring to FIG. 7, a solid state drive 700 comprises a controller 702 and FLASH memory 704. The controller 702 includes a physical layer 706, a physical layer 708, a physical layer 710, a Serial Attached SCSI port logic 712, a Serial Attached SCSI receive path 714, a serializer 716, a flash translation layer subsystem 718, an indirection table 720, a volatile memory buffer 722, a Serial Attached SCSI direct memory access data path engine queue 724, a latency estimate logic 726, and a workload monitor 728. The FLASH memory 704 includes a NAND gate group 730, a NAND gate group 732, a NAND gate group 734, and a NAND gate group 736.

The FLASH memory 704 may receive processed data from the flash translation layer subsystem 718 and return a data output. The FLASH memory 704 may include logic to determine which of the NAND gate groups to utilize to generate the data outputs, which are sent to the flash translation layer subsystem 718.

The physical layer 706, the physical layer 708, and the physical layer 710, as well as any number of physical layers interact with the host device on a physical level to send and receive data and commands. The physical layers also send control signals regarding host device performance measurements, including total command execution latency (ns), host data turnaround time (ns), command-to-total command execution latency (ns), open connection time (ns), and Serial Attached SCSI credit turnaround time (ns). The physical layers further send and receive data and commands from the Serial Attached SCSI port logic 712.

The Serial Attached SCSI port logic 712 prioritizes which of the physical layers to utilize during a data or command transfer to the host device. The Serial Attached SCSI port logic 712 may be configured by the Serial Attached SCSI direct memory access data path engine queue 724 regarding delays in sending and reporting sent and received data and commands. The Serial Attached SCSI port logic 712 further sends incoming data for NAND processing to the Serial Attached SCSI receive path 714.

The Serial Attached SCSI receive path 714 receives data for NAND processing from the Serial Attached SCSI port logic 712. The data is then sent to a serializer 716. The Serial Attached SCSI receive path 714 further sends control signals regarding workload to the latency estimate logic 726. The workload attributes may include percentage read, a queue depth, a percentage random, a transfer length, an initiator count, a port count, and input/outputs per second (TOPS).

The serializer 716 receives the data from the Serial Attached SCSI receive path 714. The serializer 716 performs the process of translating data structures or object state into a format that can be stored (for example, in a file or memory buffer) or transmitted (for example, across a network connection link) and reconstructed later (possibly in a different computer environment). The serializer 716 may be influenced by a control signal. Such a control signal may influence the flash translation layer queue depth. The processed data is then sent to the flash translation layer subsystem 718. In some embodiments, the processed data alters the flash translation layer queue depth of the flash translation layer subsystem 718, altering the number of commands the flash translation layer subsystem 718 is concurrently processing.

The flash translation layer subsystem 718 receives the processed data as well as the control signal to determine the flash translation layer queue depth. The flash translation layer subsystem 718 may interact via control signals with the indirection table 720 to determine the address to send data and commands to the FLASH memory 704 and the volatile memory buffer 722. The flash translation layer subsystem 718 may then send data and commands to the FLASH memory 704 and the volatile memory buffer 722. The flash translation layer subsystem 718 also receives the data outputs from the FLASH memory 704.

The indirection table 720 stores address locations for various components of the solid state drive 700 to be utilized by the flash translation layer subsystem 718. The flash translation layer subsystem 718 may provide estimates of the swap time for cached flash translation layer pages that will be incurred for executing a command and thus contributing to the command latency.

The volatile memory buffer 722 may send and receive data (processed data, data outputs, etc.) from the flash translation layer subsystem 718 and the Serial Attached SCSI direct memory access data path engine queue 724. The volatile memory buffer 722 is a region of a physical memory storage used to temporarily store data while it is being moved from one place to another. For example, the volatile memory buffer 722 may store processed data that is not actively queued in the flash translation layer subsystem 718 and send further processed data upon request by the flash translation layer subsystem 718. The flash translation layer subsystem 718 may perform a similar process for data outputs for the Serial Attached SCSI direct memory access data path engine queue 724.

The Serial Attached SCSI direct memory access data path engine queue 724 determines the scheduling of host device data transfers (e.g., of data outputs) and the scheduling of host device responses. The Serial Attached SCSI direct memory access data path engine queue 724 communicates with the Serial Attached SCSI port logic 712 to send and receive this data and commands. The scheduling of the host device data transfers and the host device responses may be influenced by control signals. The Serial Attached SCSI direct memory access data path engine queue 724 may be altered by the control signals to delay the data transfers or the response frames. The Serial Attached SCSI direct memory access data path engine queue 724 further sends control signals regarding workload to the latency estimate logic 726. The workload attributes may include percentage read, a queue depth, a percentage random, a transfer length, an initiator count, a port count, and input/outputs per second (IOPS).

The latency estimate logic 726 receives the workload attributes from the Serial Attached SCSI receive path 714 and the Serial Attached SCSI direct memory access data path engine queue 724. The workload attributes are then sent to the workload monitor 728. The latency estimate logic 726 may determine a latency estimate for each command received from the Serial Attached SCSI receive path 714. The latency estimate logic 726 may utilize the processes depicted in FIGS. 2-5 to determine the latency estimate. The latency estimate logic 726 may also receive controls to determine the current workload from the workload monitor

728. The latency estimate may then be sent to the Serial Attached SCSI port logic 712 via the control channel 738.

The workload monitor 728 receives the workload attributes from the latency estimate logic 726. The workload monitor 728 may then determine a workload type by achieving a workload type lock. The workload monitor 728 may then determine the workload estimate to the latency estimate logic 726.

Figure 8:
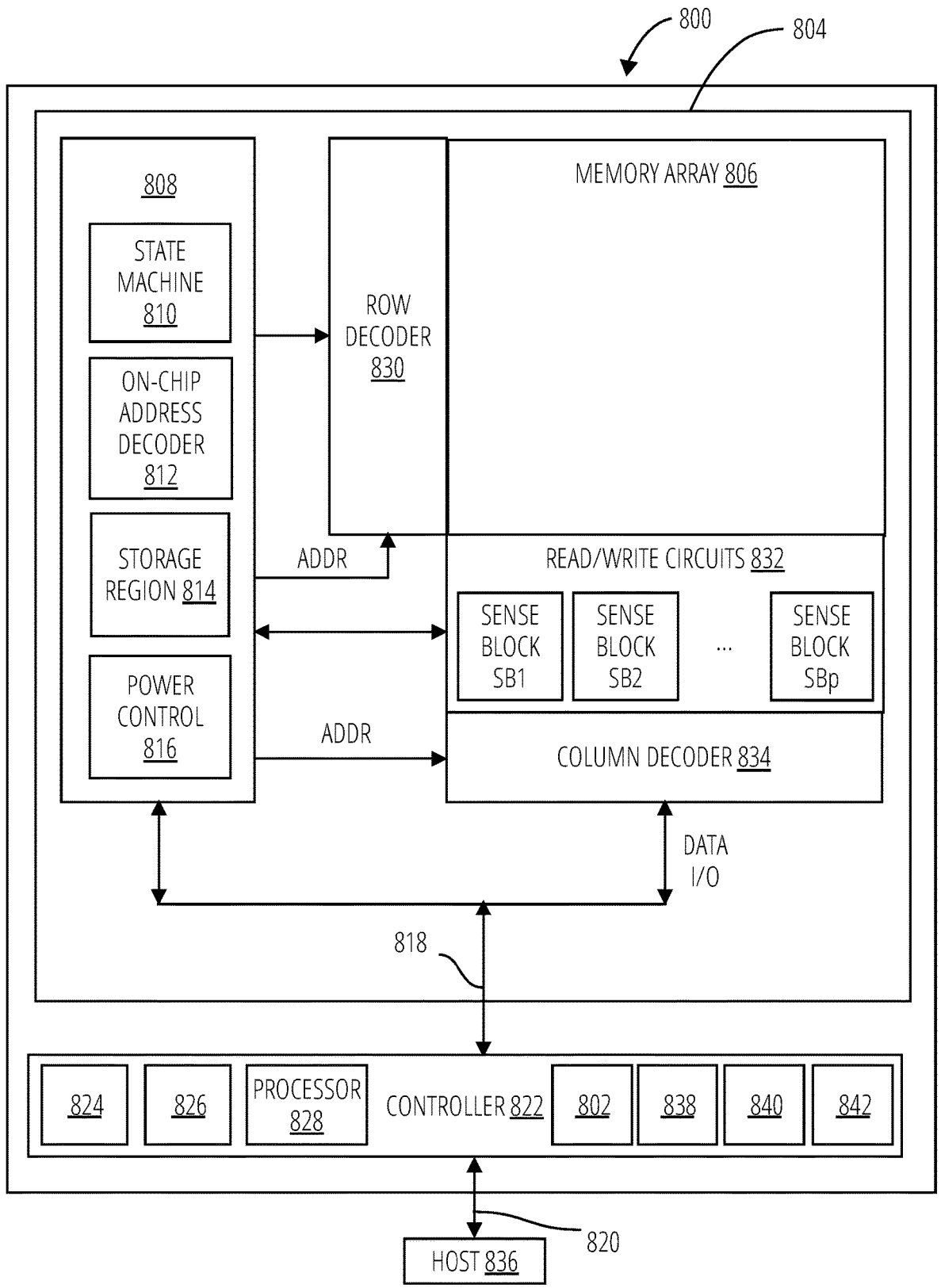
FIG. 8 is a block diagram of an example solid state drive 800.

FIG. 8 is a block diagram of an exemplary solid state drive 800. The solid state drive 800 may include one or more memory die 804. The memory die 804 includes a memory array 806 of memory cells, such as an array of memory cells herein referred to as a memory array, an address controller 808, and read/write circuits 832. The memory array 806 is addressable by word lines via a row decoder 830 and by bit lines via a column decoder 834. The read/write circuits 832 include multiple sense blocks SB1, SB2, . . . , SBp (sensing circuitry) and allow a page of memory cells to be read or programmed in parallel. Typically a read/write controller 822 is included in the same solid state drive 800 (e.g., a removable storage card) as the one or more memory die 804. Commands and data are transferred between the host device 836 and read/write controller 822 via a data bus 820, and between the controller and the one or more memory die 804 via lines 818.

The memory array 806 can be two-dimensional (2D—laid out in a single fabrication plane) or three-dimensional (3D—laid out in multiple fabrication planes). The memory array 806 may comprise one or more array of memory cells including a 3D array. In one embodiment, the memory array 806 may comprise a monolithic three-dimensional memory structure (3D array) in which multiple memory levels are formed above (and not in) a single substrate, such as a wafer, with no intervening substrates. The memory array 806 may comprise any type of non-volatile memory that is monolithically formed in one or more physical levels of arrays of memory cells having an active area disposed above a silicon substrate. The memory array 806 may be in a non-volatile solid state drive having circuitry associated with the operation of the memory cells, whether the associated circuitry is above or within the substrate.

The address controller 808 cooperates with the read/write circuits 832 to perform memory operations on memory cells of the memory array 806, and includes a state machine 810, an address decoder 812, a temperature controller 838, and a power control 816. The state machine 810 provides chip-level control of memory operations. A store region selector 814 may be provided, e.g., for programming parameters as described further below.

The address decoder 812 provides an address interface between that used by the host or a read/write controller 822 to the hardware address used by the row decoder 830 and column decoder 834. The power control 816 controls the power and voltages supplied to the various control lines during memory operations. The power control 816 and/or read/write circuits 832 can include drivers for word lines, source gate select (SGS) transistors, drain gate select (DGS) transistors, bit lines, substrates (in 2D memory structures), charge pumps, and source lines. The power control 816 can therefore include various first voltage generators (e.g., the drivers) to generate the voltages described herein. The sense blocks can include bit line drivers and sense amplifiers in one approach.

In some implementations, some of the components can be combined. In various designs, one or more of the components (alone or in combination), other than memory array 806, can be thought of as at least one control circuit or controller which is configured to perform the techniques described herein. For example, a control circuit may include any one of, or a combination of, address controller 808, state machine 810, address decoder 812, column decoder 834, power control 816, control processor 828, error correction unit 802, sense blocks SB1, SB2, . . . , SBp, read/write circuits 832, read/write controller 822, and so forth.

The read/write controller 822 may comprise a control processor 828, memory devices (memory) such as controller read-only memory 824 and controller volatile memory 826, and other functional units known in the art.

The memory devices of the read/write controller 822 may comprise code such as a set of instructions, and the control processor 828 is operable to execute the set of instructions to provide aspects of the functionality described herein. Alternatively or additionally, the control processor 828 can access code from the memory array 806, such as a reserved area of memory cells in one or more word lines.

For example, code can be used by the read/write controller 822 to access the memory array 806 for programming (write), read, and reset operations. The code can include boot code and control code (e.g., set of instructions). The boot code is software that initializes the read/write controller 822 during a booting or startup process and enables the read/write controller 822 to access the memory array 806. The code can be used by the read/write controller 822 to control one or more memory structures. In one embodiment, upon being powered up, the control processor 828 fetches the boot code from the controller read-only memory 824 or memory array 806 for execution, and the boot code initializes the system components and loads the control code into the controller volatile memory 826. Once the control code is loaded into the controller volatile memory 826, it is executed by the control processor 828. The control code includes drivers to perform basic tasks such as controlling and allocating memory, prioritizing the processing of instructions, and controlling input and output ports.

As noted prior the read/write controller 822 may dynamically evaluate the memory host device workload characteristics and apply settings for the flash translation layer 840 or the host device interface 842 accordingly. Generally, the read/write controller 822 may be configured to perform the functions described herein including the command latency estimation system 200, the latency estimation system 300, the command latency estimation process 400, the file system update latency estimation process 500, and the workload estimation process 600 discussed previously, and provide the latency estimates discussed previously. The control code can implement a sequencer to control the timing (start and stop times, durations, spacing etc.) of the various actions described herein.

Although only a single flash translation layer 840 or host device interface 842 is illustrated, there may be multiple ones that are not necessarily contiguous addresses in physical memory. The mode page described previously may be implemented for example in the controller read-only memory 824 or controller volatile memory 826.

In one embodiment, the host device 836 is a computing device (e.g., laptop, desktop, smartphone, tablet, digital camera) that includes one or more processors, one or more processor readable storage devices (RAM, ROM, flash memory, hard disk drive, solid state memory) that store processor readable code (e.g., software) for programming the read/write controller 822 to perform the methods described herein. The host may also include additional system memory, one or more input/output interfaces and/or one or more input/output devices in communication with the one or more processors, as well as other components well known in the art.

The store region selector 814 may be a non-volatile memory such as NAND flash memory, or another type, implementing a memory map or address translation table. The store region selector 814 may select the flash translation layer 840 or the host device interface 842 in response to the flash translation layer 840 or the host device interface 842 detecting a burst write operation from the host device 836.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the disclosed techniques and devices are not limited to the two-dimensional and three-dimensional exemplary structures described but covers all relevant memory structures within the spirit and scope of the technology as described herein and as understood by one of skill in the art.

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

"Logic" is used herein to refer to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method solid state drive comprising:
   receiving, at a solid state drive and from a host device, a command regarding a group of files, wherein execution of the command by the solid state drive involves a file system update; and
   reporting, from the solid state drive to the host device, prior to completion of the command by the solid state drive, a latency estimate comprising:
   a block erase time estimate;
   a swap time estimate for cached flash translation layer pages;
   a garbage collection time estimate; and
   a random access latency estimate for the group of files based on a number of random memory accesses needed to perform the file system update.

2. The method of claim 1, further comprising:
   receiving, at the solid state drive and from the host device, information about at least one of:

a number of files in the group of files; and
a size of each file in the group of files; and
determining, using the information received, the random access latency estimate for the group of files.

3. The method of claim 1, wherein the command comprises a write command or an erase command.

4. The method of claim 1, wherein:
the random access latency estimate is further based on a random access time value; and
the random access time value was configured in the solid state drive at manufacturing time.

5. The method of claim 1, wherein:
the random access latency estimate is further based on a random access time value; and
the solid state drive comprises learning logic to dynamically determine the random access time value over time.

6. The method of claim 1, wherein the latency estimate further comprises
an outstanding workload completion time estimate.

7. The method of claim 6, further comprising:
reporting, from the solid state drive to the host device, a time period needed to format the solid state drive to perform the file system update.

8. The method of claim 6, wherein:
the solid state drive utilizes a non-blocking host interface protocol; and
the outstanding workload completion time estimate excludes a latency of commands received prior to the command and having a lower priority than the command.

9. A solid state drive comprising:
a flash translation layer comprising at least one command queue;
a host device interface configured to:
receive a command from a host device, the command involving a file system update for a group of files; and
latency estimation logic coupled to the host device interface; and
a workload monitor coupled to the latency estimation logic and configured to determine a workload completion time estimate based, at least in part, on contents of the at least one command queue;
wherein the latency estimation logic is configured to:
perform a latency estimate on the command received from the host device, the latency estimate based on a block erase time estimate, a swap time estimate for cached flash translation layer pages, a garbage collection time estimate, and the workload completion time estimate provided from the workload monitor; and
report the latency estimate to the host device prior to completion of the command.

10. The solid state drive of claim 9, wherein:
the host device interface is further configured to receive, from the host device and in association with the command,
information about at least one of:
a number of files in the group of files; and
a total amount of data in the group of files; and
the latency estimation logic is further configured to use the received information to perform the latency estimate.

11. The solid state drive of claim 9, wherein the command comprises one or more of a write command and an erase command.

12. The solid state drive of claim 10, wherein the latency estimate comprises a random access latency estimate based on the received information.

13. The solid state drive of claim 12, wherein the random access latency estimate is based on a number of random memory accesses needed to perform the file system update.

14. The solid state drive of claim 12, wherein the random access latency estimate is based on a random access time value configured in the solid state drive at manufacturing time.

15. The solid state drive of claim 12, further comprising learning logic configured to:
dynamically estimate a random access time value over time; and
apply the random access time value to determine the random access latency estimate.

16. The solid state drive of claim 9, wherein the latency estimate further comprises a file system update time estimate.

17. The solid state drive of claim 16, wherein the file system update time estimate comprises a time period needed to format the solid state drive.

18. The solid state drive of claim 9, wherein:
the host device interface utilizes a non-blocking host interface protocol; and
the workload completion time estimate excludes a latency of commands received prior to the command and having a lower priority than the command.

19. A solid state drive comprising:
means for receiving from a host device a command;
means for determining a time estimate for completion of the command by the solid state drive, the time estimate comprising an accumulation of a block erase time estimate, a swap time estimate for cached flash translation layer pages, a garbage collection time estimate, and an outstanding workload completion time estimate; and
means for reporting the time estimate to the host device prior to completion of the command.

20. The solid state drive of claim 19, wherein the means for determining the time estimate comprises:
means for determining the garbage collection time estimate;
means for determining the swap time estimate for the cached flash translation layer pages;
means for determining the block erase time estimate; and
means for determining the outstanding workload completion time estimate.

* * * * *